United States Patent [19]

Boesch et al.

[11] Patent Number: 5,168,896
[45] Date of Patent: Dec. 8, 1992

[54] MECHANISM FOR OPENING AND CLOSING VALVE

[75] Inventors: Hubert Boesch, Lustenau, Austria; Tsutomu Taniguchi, Yokohama, Japan

[73] Assignee: Fuji Seiki Inc., Kanagawa, Japan

[21] Appl. No.: 757,947

[22] Filed: Sep. 12, 1991

[30] Foreign Application Priority Data

Sep. 13, 1990 [JP] Japan .................. 2-242887

[51] Int. Cl.$^5$ .............. F16K 31/122; F16K 37/00
[52] U.S. Cl. ........................... 137/553; 91/1; 137/552; 137/554; 251/58; 251/204; 251/251; 251/335.3
[58] Field of Search .......... 91/1; 137/552, 553, 137/554; 251/58, 204, 251, 335.3

[56] References Cited

U.S. PATENT DOCUMENTS

| | | | |
|---|---|---|---|
| 3,298,659 | 1/1967 | Cupedo | 251/58 X |
| 4,343,455 | 8/1982 | Winkler | 251/58 |
| 4,470,576 | 9/1984 | Schertler | 251/204 X |
| 4,504,038 | 3/1985 | King | 251/58 |
| 4,634,094 | 1/1987 | Geiser | 251/58 |
| 4,651,969 | 3/1987 | Dowdall | 251/58 X |
| 4,669,701 | 6/1987 | Tinner | 251/58 X |

Primary Examiner—Gerald A. Michalsky
Attorney, Agent, or Firm—Webb, Burden, Ziesenheim & Webb

[57] ABSTRACT

A valve operating mechanism produces a rotating force for causing a valve body of the valve to shift relative to a valve seat thereof, so that the valve is opened and closed. A piston of the mechanism produces a rectilinear reciprocating force. A screw member is supported moveably along the rectilinear line and unrotatably in the housing and includes a pair of pawls helically projecting along the rectilinear line and a helical interval space defined between the helical pawls. A pivot is inserted into the helical interval space. A cylindrical rotating member is supported rotatably and unmoveably along the rectilinear line in the housing so as to surround the screw member. When the screw member receives the rectilinear reciprocating force to perform the reciprocating motion along the rectilinear line, the pivot is urged to rotate along the helical interval space in the rectilinearly unmoved state, and the cylindrical rotating member can rotate with the pivot. Therefore the cylindrical rotating member can output the rotating force for causing the valve body of the valve to shift relative to the valve seat thereof.

6 Claims, 6 Drawing Sheets

MECHANISM FOR OPENING AND CLOSING VALVE

FIELD OF THE INVENTION

This invention relates to a mechanism for opening and closing valve, for example, a gate valve.

BACKGROUND OF THE INVENTION

In the case where such a valve, for example, a gate valve or butterfly valve, is used, there is sometimes adopted a mechanism for opening and closing the valve, wherein a rectilinear motion of a piston operated by an air pressure or oil pressure is converted into a rotary motion, and by this rotary motion a valve body is shifted relative to a valve seat to open and close the valve.

In that case, it is known that the rectilinear motion may be converted into the rotary motion, for example, by a mechanism wherein the piston that moves rectilinearly is provided with a rack gear, a member that rotates is provided with a pinion gear mating with this rack gear, and the valve is opened or closed when the pinion gear is rotated by the rectilinear motion of the rack gear.

In this rack-and-pinion mechanism, however, that is such a drawback that because the center of rotation of the pinion gear is perpendicular to the rectilinear shifting direction of the rack gear, the mechanism is liable to become large in size. In addition, the valve using such a mechanism as mentioned above has such a drawback that in order to maintain sealing properties between the portion at which the valve body contacting with a fluid is located and the portion that drives the valve body to shift, a sliding material must be fitted to the sliding portion, but the sliding portion to which the sliding material has been applied is apt to be insufficient in sealing properties.

Further, there is developed a valve operating mechanism which is designed that the traveling direction of a rectilinear traveling means is in the same direction as in the center of rotation of a rotary traveling means. For example, in a valve operating mechanism comprising a cylindrical body having a convex portion on its inner periphery as a rectilinear traveling means and a rotary shaft having a helical groove mating with said convex portion as a rotary traveling means, said rotary shaft being fitted inside said cylindrical body, the rotary shaft used as the rotary traveling means is rotated by traveling rectilinearly the cylindrical body, while mating the convex portion with the helical groove.

In the mechanism as mentioned above, however, the convex portion is difficult to move through the helical groove and, moreover, a large frictional force is produced between the convex portion and the helical groove. On that account, an efficiency of converting a rectilinear motion into a rotary motion is poor, and a loss of energy arising from this conversion must be supplemented anyhow, hence a force larger than the predetermined force should be applied to this cylindrical body used as the rectilinear traveling means. Accordingly, there was such a problem that because such a large force as mentioned above is needed, the mechanism as illustrated must be unavoidably large in size.

In addition thereto, when a vacuum valve is operated, for example, by means of the above-mentioned valve operating mechanism, the main valve chamber wherein the valve body travels must be evacuated, while the valve operating mechanism is in an atmosphere. On that account, as a sealing material used between the main valve chamber and the fixed side of the valve operating mechanism, there is provided a bellows flexible with the traveling of the cylindrical body so that the bellows covers the rotary shaft used as the rotary traveling means. However, this mechanism has such a problem that a rotational force of the rotary shaft is sometimes applied to the bellows which then undergo deterioration with time to a marked extent, thus the service life of the bellows is shortened. Furthermore, there is another problem that because a force larger than necessary is needed, a large-sized valve operating mechanism has come to be required, with the result that the borrows of large size is needed.

SUMMARY OF THE INVENTION

The present invention is intended to solve such problems associated with the prior art as mentioned above, and an object of the invention is to provide a compact valve operating mechanism in which a rectilinear traveling can be converted into a rotary motion efficiently and smoothly.

The valve operating mechanism for producing a rotating force for causing a valve body of a valve to shift relative to a valve seat thereof, so that the valve is opened and closed, said mechanism comprising:

means, arranged in the housing of said mechanism, for producing a rectilinear reciprocating force;

a screw member supported moveably along the rectilinear line and unrotatably in the housing, receiving the rectilinear reciprocating force to perform a reciprocating motion along the rectilinear line, and including a pair of pawls helically projecting along the rectilinear line and a helical interval space defined between the helical pawls;

a pivot inserted into the helical interval space, and including both ends thereof; and a cylindrical rotating member supported rotatably and unmoveably along the rectilinear line in the housing so as to surround the screw member, and including a pair of holes formed in the peripheral surface of the cylindrical rotating member and supporting the both ends of the pivot, so that when the screw member receives the rectilinear reciprocating force to perform the reciprocating motion along the rectilinear line, the pivot is urged to rotate along the helical interval space in the rectilienarly unmoved state, and the cylindrical rotating member can rotate together with the pivot, whereby the cylindrical rotating member can output the rotating force for causing the valve body of the valve to shift relative to the valve seat thereof.

In the present invention, as mentioned above, the conversion means to convert a rectilinear motion into a rotary motion is composed of the screw and the pivot to be fitted to the space between the pawls of said screw, and the direction of rectilinear motion of the shaft shifting means is in the same direction as in the center of rotation of the cylindrical rotating member, hence the valve operating mechanism of the invention can be designed so as to make it compact. Further, the pivot can shift smoothly in the space between the pawls of the screw, hence a rectilinear motion of the shaft shifting means is smoothly transmitted through the screw and the pivot to the cylindrical rotating member, with the result that this cylindrical rotating member rotates efficiently and smoothly and thereby to operate the valve body. As the result of a marked improvement in conversion efficiency attained in this manner in the valve operating mechanism of the invention in comparison with the prior art mechanisms, it is not necessary to make up the loss occurred through the above-mentioned conversion by supplementing a force larger than necessary to the shaft shifting means, and this mechanism can also be designed to make it compact in size. Furthermore, because a rotational force of the pivot to be transmitted to the bellows used for sealing a space between the main valve body and the valve operating mechanism is relatively small, deterioration of the bellows is slight and the bellows can be used for an extended period of time.

DETAILED DESCRIPTION OF THE PREFERRED EMBODIMENT OF THE PRESENT INVENTION

The embodiment of the present invention is illustrated below with reference to the accompanying drawings.

FIGS. 1 to 7 show a gate valve which is a vacuum valve used to evacuate one side of a pipe (not shown).

This gate valve comprises a main valve body 10 to open and close the pipe (not shown) and a valve operating mechanism 30 according to the embodiment of the invention.

Figure 1:
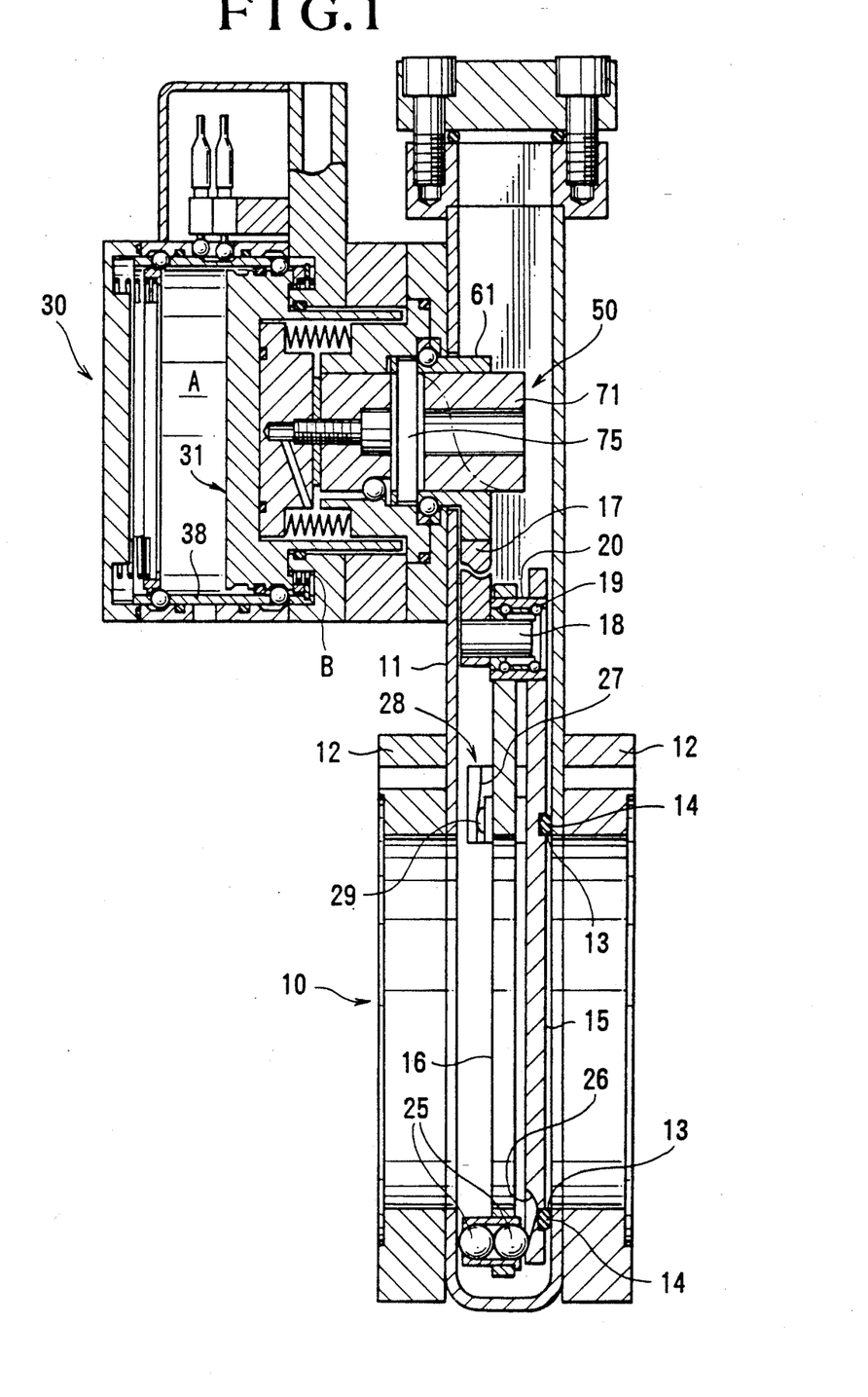
FIG. 1 is a sectional view of the valve operating mechanism and the main valve body operated thereby, according to an embodiment of the present invention.
Figure 2:
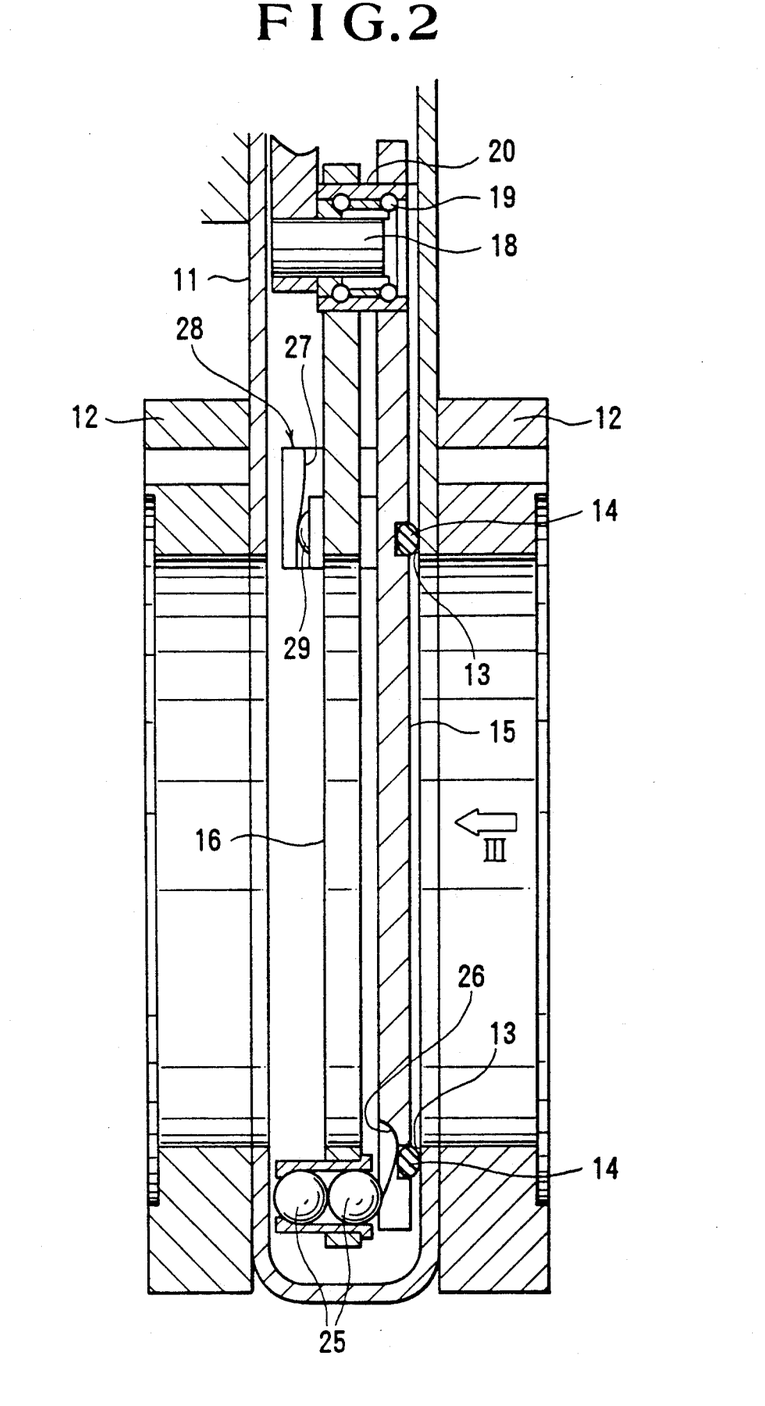
FIG. 2 is a sectional view of the main valve body shown in FIG. 1, said valve body being in a state that the valve is closed.
Figure 3:
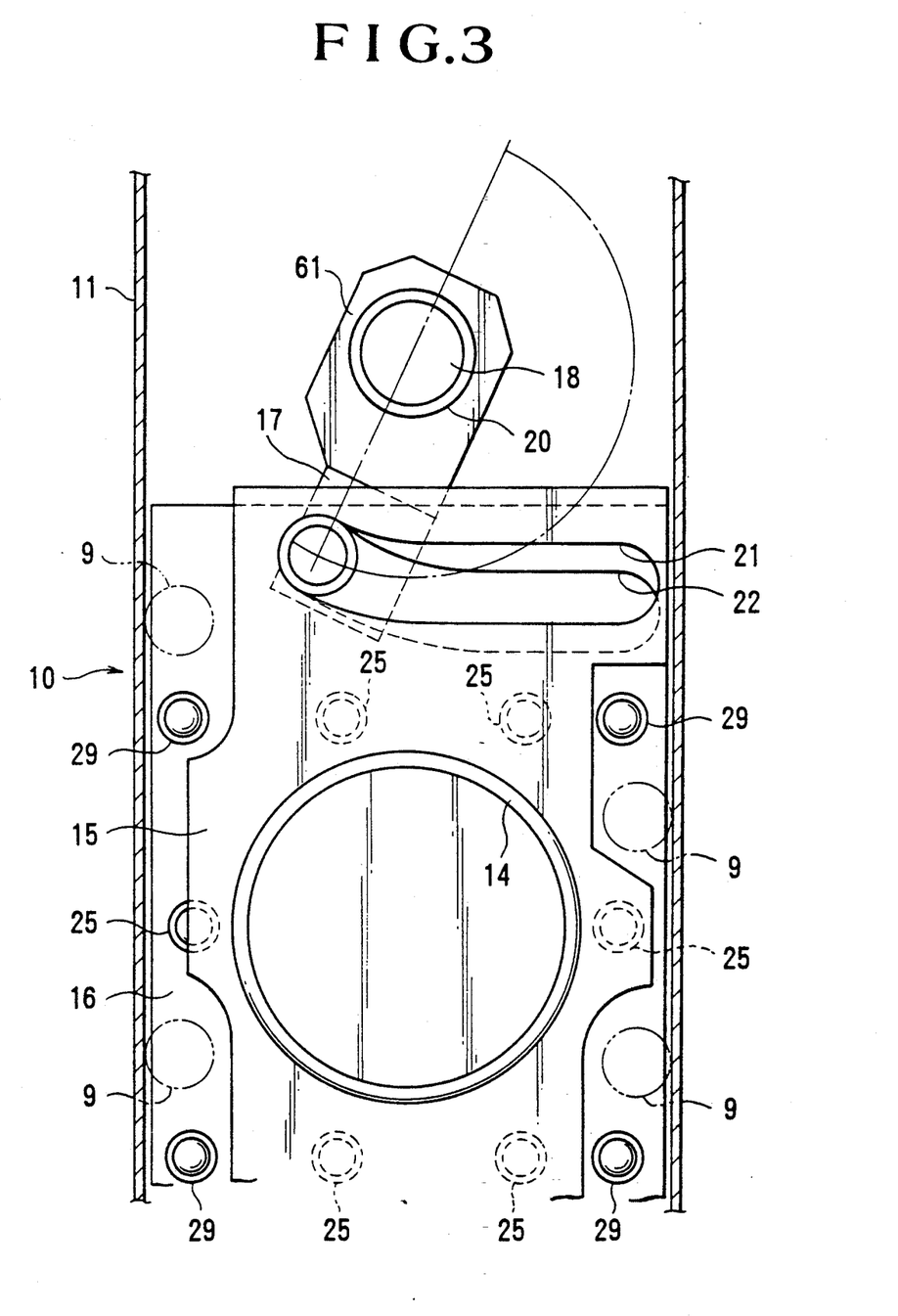
FIG. 3 is a view viewed in the direction of an arrow III shown in FIG. 2.
Figure 4:
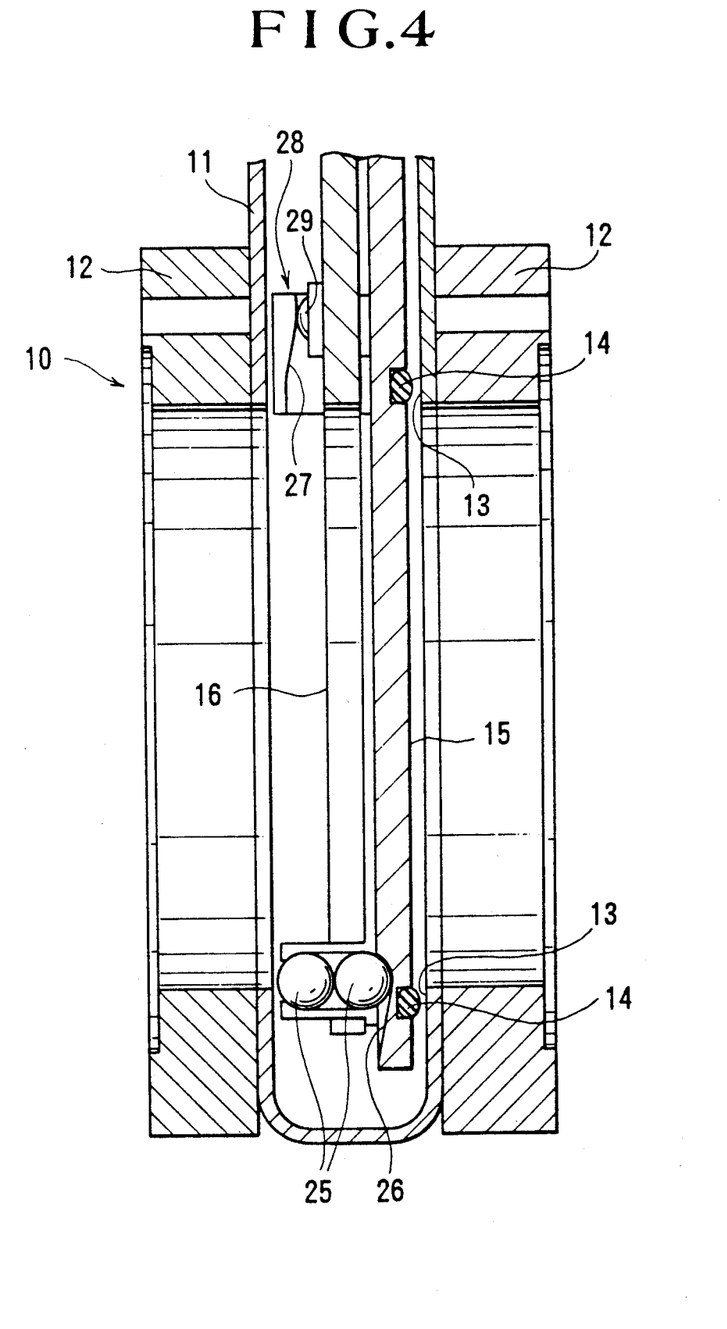
FIG. 4 is a sectional view of the main valve body shown in FIG. 1, said valve body being in a state just before the valve is closed.

First, the main valve body 10 is illustrated with respect to its structure by reference to FIGS. 1 to 4. FIG. 2 shows a state of the valve wherein said valve is closed, FIG. 4 shows a state of the valve immediately after said valve is opened, and FIG. 3 shows a view viewed in the direction of the arrow III shown in FIG. 2.

The main valve body is provided with a housing 11 formed into a sack-like form, and a pair of symmetrically arranged flanges for connecting the pipes (not shown) are fixed on both outsides of the housing 11. In the housing 11 and flanges 12, there are formed openings through which a fluid passes through, and valve seats 13 are defined by a side wall near one of the openings of the housing 11. In the housing 11, a valve body 15 is provided so as to be vertically movable, and a sealing member 14 contained in this valve body 15 brought into contact under pressure with the valve seat 13 to close the valve.

This valve body 15 is shifted between the lower position (at which the valve is closed) and the upper position (at which the valve is opened) by means of the following blocking mechanism.

This blocking mechanism is provided, as shown in FIG. 3, with a guide plate 16 arranged in parallel with the valve body 15, and the valve body 15 and guide plate 16 are designed to be guided vertically along the inner wall of the housing 11 by means of a plurality of guide rollers 9. As shown in FIGS. 2 and 3, the upper portion of the valve body 15 and guide plate 16 are supported by an arm 17 of the valve operating mechanism 30. That is, a fixed shaft 18 is fixed to this arm 17, and a fixed shaft 18 is fixed to this arm 17, and a roller 20 fitted rotatably to the fixed shaft 18 through a bearing 19. This roller 20 is designed, as shown in FIG. 3, to slide on two guide grooves 21 and 22 respectively formed on the valve body 15 and guide plate 16. Accordingly, when the arm 17 is rocked, the roller 20 is guided in the guide grooves 21 and 22, and the valve body 15 and guide plate 16 are shifted vertically in the housing 11.

Further, as shown in FIG. 3, the guide grooves 21 and 22 are on the same level at the left end, but at the right end the guide groove 21 for the valve body 15 is on a level higher than that of the guide groove 22 for the guide plate 16. When the roller 20 comes to the left end of the guide grooves 21 and 22, the valve body 15 and guide plate 16 are on the same level. In that case, the valve body 15 and guide plate 15 are designed to take the lower position (at which the valve is closed) and the upper position (at which the valve is opened). On the one hand, when the roller 20 comes to the right end wherein the guide grooves 21 and 22 are different in height, the position of the guide plate 16 is higher than that of the valve body 15. In that case, the valve body 15 and guide plate 16 are designed to take a middle position between the upper position (at which the valve is closed) and the lower position (at which the valve is opened).

Accordingly, as shown in FIG. 4, immediately before the valve is closed, the roller 20 stays at a place where the guide grooves 21 and 22 are different in height, and the position of the guide plate 16 is higher than that of the valve body 15. However, when a completely closed position (the lower position) is intended to take, the roller 20 is guided from the place where the guide grooves 21 and 22 are different in height to a place where the guide grooves 21 and 22 are on the same level (the left end of the guide grooves 21 and 22 in FIG. 3), hence the guide plate 16 is pushed down relative to the valve body 15, and the valve body 15 and guide plate 16 are stopped at the same level. Inversely, when the valve body 15 and guide plate 16 move from the completely closed position (the lower position) toward the opened position (the upper position), the roller 20 is guided from a place wherein the guide grooves 21 and 22 are on the same level to a plate is pushed up relative to the valve body 15, resulting in a state the position of the guide plate is higher than that of the valve body 15.

When the opened position (the upper position) is intended to take, the operation is carried out in the same way as in the case of the closed position (the lower position), though the operation is not illustrated in particular.

In this locking mechanism, it is designed that when the valve body 15 and guide plate 16 approach the valve closed position, the valve body 15 is moved to approach the valve seat 13, which the valve body 15 and guide plate 16 begin to move toward the valve opened position, the valve body 15 is moved from the valve seat to shift near the guide 16.

That is, as shown in FIGS. 2 and 4, a pair of balls 25 are provided below the guide plate 16, said balls being urged by a spring (not shown) toward the valve body 15, and a concave guide groove 26 in which the balls 25 slide is provided below the valve body 15. This guide groove 26 is designed that the deeper is the upper side, the shallower is the lower side. The balls 25 and the guide groove 26 are provided in a plurality of places, as shown in FIG. 3.

Accordingly, as shown in FIG. 4, when the valve body 15 is moved downward in the housing, while the balls 25 are engaged in the guide groove 26, and comes to the position opposite to the valve seat 13, the guide plate 16 is further moved downward as mentioned previously. By this movement, the balls 25 slide downward in the guide groove 26, and consequentially the valve body 15 parts from the guide plate 16 and is moved to approach the valve seat 13, with the result that the valve body 15 is pressed to the valve seat 13 and then locked. By this movement, the valve is closed.

On the one hand, as shown in FIGS. 2 and 4, the valve body 15 is provided with a projection 28 having a guide cam 27, and the guide plate 16 is provided with balls 29 to slide the guide cam 27. The balls 29, though not shown, are the same as the balls 25 mentioned previously, and urged toward the guide cam 17. The guide cam 27 is designed that it is apart from the valve body 15 and guide plate 15 when it goes to lower side, and it is near the valve body 15 and guide plate 16 when it goes to the upper side. As shown in FIG. 3, the balls 29 and the guide cam 27 are provided at a plurality of places.

Accordingly, when the valve body 15 and guide plate 16 start to move from the closed position (the lower position) to the opened position (the upper position), the guide plate 16 is pushed up relative to the valve body 15 as mentioned previously, the balls 29 slide upward in the guide cam 27 and, consequentially the valve body 15 parts from the valve seat 12, and is moved in the direction approaching the guide plate 16 and then blocked in this state.

Different from the prior art mechanisms, in this blocking mechanism, the valve is closed or opened under such conditions that the guide plate 16 is not brought into contact under pressure with the bottom wall of the housing 11, hence the noise that occurs when the valve is closed is soft. Further, the valve body 15 and guide plate 16 are moved continuously by means of the arm 17, and no stop for valve body and guide plate is required, hence the motion of the valve body and guide plate is smooth and no knocking will occur. Furthermore, this locking mechanism can be easily taken out of the housing 11 at the time of maintenance and, moreover, the mechanism is very simple in structure, hence it is very easy to maintain this locking mechanism.

Figure 5:
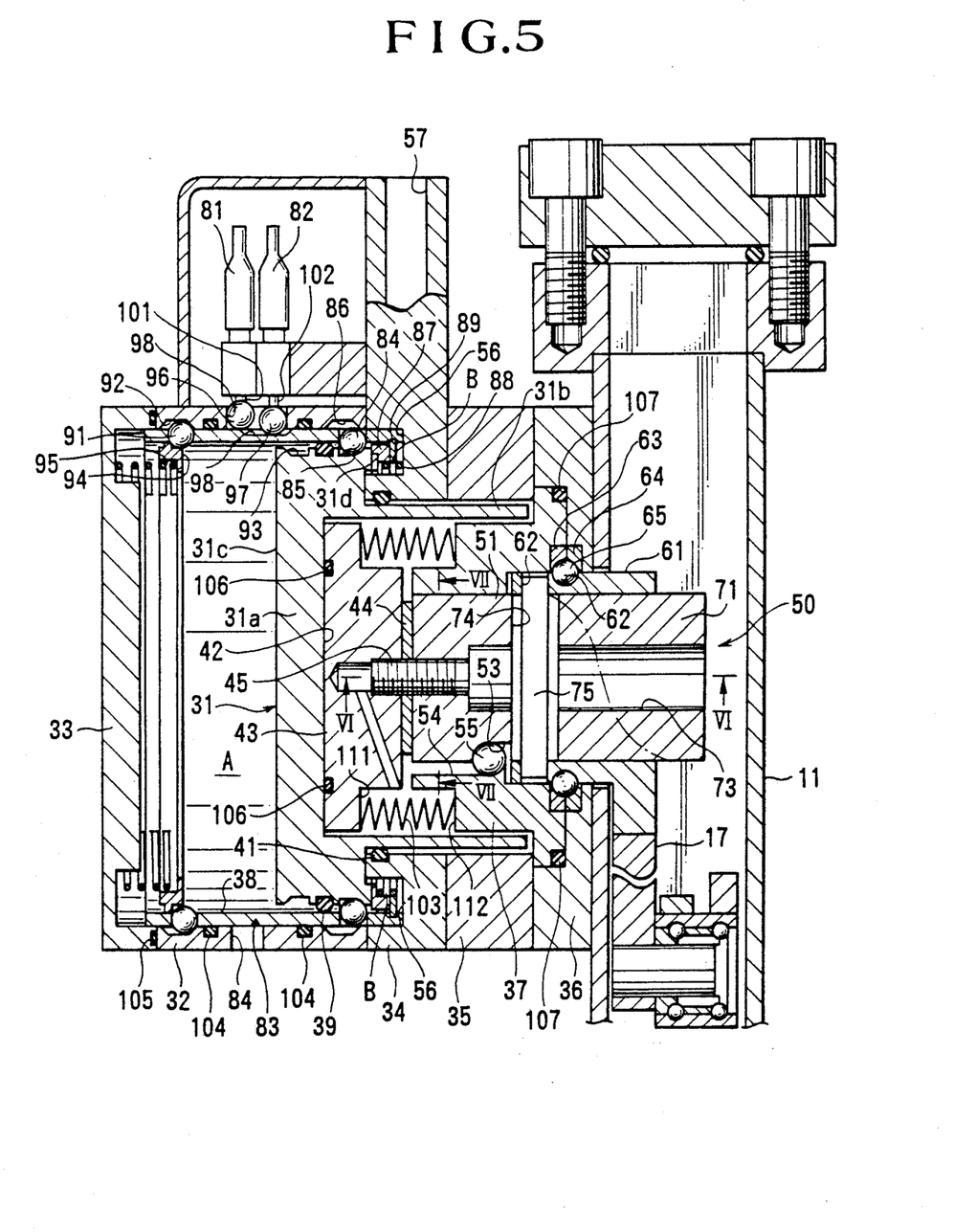
FIG. 5 is an enlarged sectional view of the valve operating mechanism of the embodiment of the present invention shown in FIG. 1.
Figure 6:
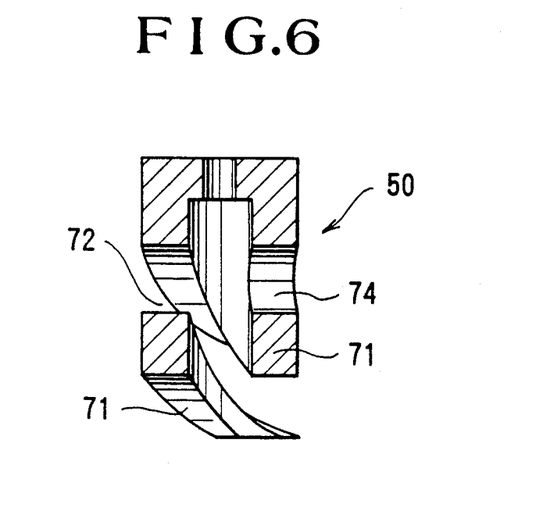
FIG. 6 is a sectional view took along the VI~VI line in FIG. 5.
Figure 7:
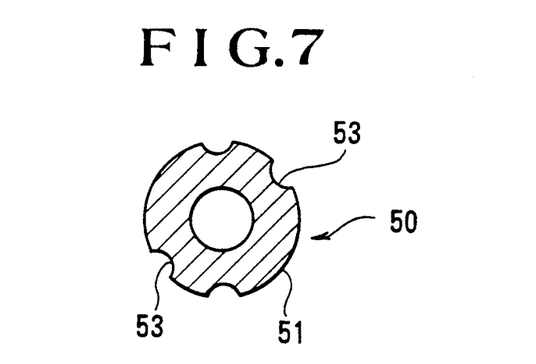
FIG. 7 is a sectional view took along the VII~VII line in FIG. 5.

The valve operation mechanism 30 according to the embodiment of the invention is illustrated hereinafter by reference to FIGS. 5 to 7. FIG. 5 is an enlarged sectional view of the valve operating mechanism shown in FIG. 1, FIG. 6 is sectional view taken along the VI~VI line in FIG. 5, and FIG. 6 is a sectional view taken along the VII~VII line in FIG. 4.

In this valve operating mechanism 30, as shown in FIG. 5, basically, a piston 31 is shifted rectilinearly by an air pressure, a screw 50 is moved rectilinearly by the piston 31, the rectilinear motion of this screw 50 is converted into a rotary motion of a pivot 75 and thereby the arm 17 is rotated, and consequentially the valve is opened or closed in the manner as mentioned previously.

First, the rectilinear motion of the piston 31 is illustrated below.

The housing of this valve operating mechanism is composed of a cylindrical member 32, a covering member 33 to blockade the left side end of this cylindrical member 32, the first cylindrical block 34 arranged at the right side of the cylindrical member 32, the second cylindrical block 35 fixed to the right side of the first block 34, the third cylindrical block 36 fixed to the right side of the second block 35, and the fourth block 37 arranged inside the second and third blocks 35 and 36.

On the one hand, sleeves 38 are slideably arranged inside the cylindrical member 32, and the piston 31 is arranged slideably in the sleeves 38. The piston 31 comprises a large diameter portion 31a and a small diameter portion 31b smaller in diameter than the large diameter portion 31a and formed into a cylindrical shape, said small diameter portion 31b sliding inside the first block 34, and between the second block 35 and the fourth block 37. The space between the large diameter portion 31a and sleeves 38 is sealed by means of O-ring 39, and the space between the small diameter portion 31b and the second block 35 is also sealed by means of O-ring 41.

At the bottom portion of a sole-bearing hole 42 formed inside the piston 31, the fifth block 43 is fixed, with which a bellows as will be mentioned later is fitted. A base portion 51 of the screw 50 is fixed by means of a bolt 45 through a disk 44 to the fifth block 43. This base portion 51 of the screw 50 is fitted in the forth block 37 in such a manner that it is movable in the axial direction but is not rotatable. That is, on the outer periphery of the base portion 51, several grooves 53 extending in the axial direction are formed (see FIG. 6), and on the inner periphery of the fourth block 37 opposite to the grooves 53 of the base portion 51, several grooves 54 extending in the axial direction are also formed. Into these grooves 53 and 54, several balls 55 are inserted. Thus, a slide bearing is formed, whereby the screw 50 can be moved smoothly in the axial direction and, at the same time, the base portion is not rotatable. Accordingly, when the piston 31 is moved in the axial direction, the fifth block 43 and screw 50 are moved integrally with the piston 31.

The piston 31 is moved in the axial direction by means of an air pressure in the following manner.

The first air chamber A is defined by the left end surface 31c of the base portion 31a of the piston 31, sleeve 38 and covering member 33, while the second air chamber B is defined by an annular concave 56 formed on the first block 34 and the right end surface 31d. The left end surface 31c of the piston 31 is circle, whereas the right end surface 31d of the piston 31 is annular. On that account, the area under the pressure of the piston 31 is larger in the left and surface 31c than in the left end surface 31d.

To the first air chamber A is applied a given pressure P (concretely about 4 kgf/cm$^2$) through an air pipe (not shown) or an atmospheric pressure, and this application of the pressure is changed over from one to other by means of a three-way valve (not shown). On the one hand, to the second air chamber B is applied always the same given pressure P as in the first air chamber A by means of an air pipe 57 formed in the first block 34.

Accordingly, when the given pressure P is applied to the air chamber A, the pressure applied to the left end surface 31c is larger than that applied to the right end surface 31d. On that account, the piston 31 is moved to right, and the valve body 15 is moved so that the valve is closed, as will be mentioned later. When the piston 31 is moved to right and the right end surface 31d of the piston 31 is pressed to the first block 34, the motion of the piston 31 is stopped and the valve is completely closed.

In the valve operating mechanism according to the embodiment of the invention, when the motion of the piston 31 is stopped in this way, the piston 31 gradually slows down its speed and is going to stop slowly. That is, at that time, the second air chamber B is not evacuated, there is no action to attract the piston 31 to the side of the first block 34, and conversely, the air in the second air chamber B plays a buffer action (that is, it plays a role as a cushion), hence the piston 31 moves slowly and is pressed slowly to the first block 34 without producing a noise of collision. On that account, the valve body also moves slowly and is pressed slowly to the valve seat without producing a noise of collision. By this movement, the valve closing operation can be performed very smoothly and the service life of the valve operating mechanism can be thus prolonged.

On the one hand, when an atmospheric pressure is applied to the first air chamber A by means of the three-way valve (not shown), the piston 31 is moved to left, because the pressure applied to the right end surface 31d is larger than that applied to the left end surface 31c, and the valve body 15 is moved so that the valve is closed in the manner as will be mentioned later. When the left end surface 31c of the piston 31 which is moved to left is pressed to the right end surface of the covering member 33, the piston 31 is stopped and the valve is completely opened.

In that case mentioned above, in the same manner as in the case of closing the valve, the piston 31 is moved slowly to right and pressed to the right end surface of the covering member 11 without producing a noise of collision, because the air in the first air chamber A plays a buffer action (that is, it plays a role as a cushion), whereby the valve body can stop slowly at the position where the valve is opened. Accordingly, the opening and closing of the valve can be performed very smoothly, and the service life of the valve operating mechanism can be prolonged.

Next, the mechanism which converts a rectilinear motion of the piston 31 into a rotary motion is illustrated hereinafter.

In this mechanism, a cylindrical rotating member 61 connected to the arm 17 to move the valve body 15, and several balls 65 line between an annular concave groove 62 and a pair of bushes 63 and 64 formed on the third and fourth blocks 36 and 37, and thereby the cylindrical rotating member is supported rotatably and immovably in the axial direction by the third block 36 and the fourth block 37.

The screw 50 fitted moveably in the axial direction by means of the balls 65 to the fourth block 37 is also fitted moveably in the axial direction to the inner periphery of the cylindrical rotating member 61. As shown in FIG. 6, this screw 50 is provided with a pair of pawls formed helically projecting in the axial direction through a pair of gaps 72 having a given interval. The screw 50 is provided with a stepped hole 73 penetrating through the screw 50 in the axial direction. By virtue of the stepped hole 73 thus formed, a pivot 75 as will be mentioned later can be inserted between a pair of the gaps 72 while penetrating through this stepped hole 73. Further, at the left side of this hole 73, the base portion 51 of the screw 50 is fixed by means of the bolt 45 to the fifth block 43. Further, as shown in FIG. 6, a hole 74 is formed in the direction perpendicular to the stepped hole 73, said hole 74 continuing on the gaps 72 having a given interval between the pawls 71.

A columnar pivot 75 is thrusted in the gaps 72 between the pawls 71 and the hole 74 in the direction almost perpendicular to the shaft of the screw 50 and penetrating the stepped hole 71. This pivot 75, the both end portions of which are inserted into the annular concave grooves 62 formed in the above-mentioned cylindrical rotating member 61, is designed to be rotatable integrally with this cylindrical rotating member 61 but unmovable in the axial direction.

Accordingly, when the piston 31 is reciprocated in the axial direction, the screw 50 is reciprocated in the axial direction integrally with the piston 31. In answering thereto, the pivot 75 slides helical pawls 71 and rotates relatively through the gaps between the pawls 71. By this motion, the cylindrical rotating member 61 is rotated integrally with this pivot 75. As the result, the arm 17 connected to this cylindrical rotating member 61 is rotated to move the valve body 15 and guide plate 16, and consequentially the valve is opened or closed.

When a rectilinear motion in the axial direction of this screw 50 is converted into a rotary motion of the pivot 75, the pivot 75 is sliding on the pawls 71, hence the pivot 75 and pawls 71 are in a state of a line contact and not in a state of surface contact. On that account, practically no frictional force is produced between the pivot 75 and pawls 71, and consequentially when a force in the axial direction of the screw 50 is converted into a torque and transmitted to the pivot 75, no practical loss attended by the friction is caused, and the torque conversion efficiency can be markedly improved in comparison with the conventional ones. On that account, a large force can be converted into a torque even by using a small mechanism without using the prior art mechanisms of large size. Further, because of the markedly improved torque conversion efficiency, there is no need for making good the loss attended by the conversion as in the past and it is not necessary to apply a larger force than necessary to the shaft moving means.

Further, the gaps 72 of the pawls 71 of the screw 50 are formed so as to have always a given interval, and the pivot 75 and the pawls 71 are in a state of line contact, hence there is practically no possibility that the pivot 75 slides on the pawls 71, there is produced looseness between said pivot and said pawls. On that account, the pivot 75 can slide very smoothly on the pawls 71, hence the force in the axial direction can be converted smoothly into a torque.

The display mechanism to display the opening and closing of the valve is illustrated hereinafter.

In the display mechanism, basically, with the movement of the piston 31, the sleeve 38 moves and thereby limit switches 81 and 82 are turned on or off to display the opening or closing of the valve, and the opening or closing of the valve can also be recognized visually by seeing the motion of a mark 83 formed o the outer periphery of the sleeve 38 through a window 84.

First, several balls 84 are lying in several holes formed on the right of the sleeve 38. Concave portions 85 and 86 in which the balls 84 are engaged are formed respectively on the piston 31 and the cylindrical member 32. When the piston 31 stays at the position as shown in FIG. 4, the balls 84 are engaged in the concave portion 85 of the piston 31, but when the piston 31 moves to left, the balls 84 are pressed by the concave portion 85 of the piston 31 and are engaged in the concave portion 85 of the piston 31 and are engaged in the concave portion 86 of the cylindrical member 32, and the piston 31 will pass inside the balls 84.

Further, to the right end surface 31d of the piston 31 is pressed a ring 87 which is urged by means of a spring 88 to the left. When the piston 31 is moved to the left for a predetermined distance and the balls 4 are engaged in the concave portion 86 of the cylindrical member 32, the ring 87 is pressed to the balls 84, whereby the balls 84 and the sleeve 38 are urged to the left by the urging force of the spring 88. On the right side of the ring 87, there is arranged a C-ring 89 engaged on the cylindrical member 32.

On the one hand, several balls 91 are lying in several concave portions formed on the left side of the sleeve 38. On the cylindrical member 32, a concave portion 91 is formed in which the balls 91 are engaged, and a concave portion 93 is formed on the left peripheral surface of the piston 31, in which the balls 91 are engaged when the piston 31 is moved to the left. Further, a ring 94 is pressed to the balls 91, and the ring 94 is urged to the right by means of a spring 95, and thereby the sleeve 38 is urged to the right.

In a mechanism for turning the limit switches 81 and 82 ON-OFF, two balls 96 and 97 are lying in a hole 98 formed on the cylindrical member 32, and a concave portion 99 is formed on the sleeve 38, in which the balls 96 and 97 can be engaged. The balls 96 and 97 are urged toward the concave portion 99 by means of switches 101 and 102 of the limit switches 81 and 82.

As shown in FIG. 5, when the sleeve 38 is moved to the right, the ball 96, answering thereto, resists to the urging force of the switch 101, and the ball 96 is lifted up from the edge of the concave portion 99 and is then engaged in the hole 98 of the cylindrical member 32 to actuate the switch 101, and consequentially the limit switch 81 is turned ON to display that the valve is closed. In that case, the other ball 97 in a state of being engaged in the hole 98 by means of the edge of the concave portion 99 is pressed by the urging force of the switch 101 to engage in the concave portion 99, and consequentially, the switch 102 displaying the opening of the valve is turn OFF.

The action of the whole display mechanism is illustrated hereinafter.

In the case where the valve is transferred from the opened state to the closed state, when the piston 31 is moved to the left, the ball 84 is pressed by the piston 31 to engage in the concave portion 86 of the cylindrical member 32, and the piston passes through inside the ball 84. In that case, the ring 87 urged to the left by the spring 88 is pressed to the ball 84. Thus, the ball 84 and sleeve 38 are urged to the left, but the sleeve 38 is urged to the right by the urging force of the spring 95 through the ring 94 and the ball 91, hence the urging forces to the left and right are well balanced, and the sleeve 38 is stopped in the state as shown in FIG. 5.

Thereafter, the piston 31 passes through inside the ball 91, and when it is pressed to the ring 94, while resisting the urging force of the spring 95, to move the ring 94 to the left, and the ring 94 parts from the ball 91, hence the urging force which urges the ball 91 and the sleeve 38 to the right is released. By this movement, the sleeve 38 urged by the spring 88 through the ring 87 and the ball 84 is moved to the left. As the result, as mentioned above, the ball 97 is lifted up and the ball 96 is pressed down, and the limit switch 102 displaying the opening of the valve is turned ON, and the limit switch 101 displaying the closing of the valve is turned OFF. In that case, it is possible to recognize the closing of the valve by visually seeing the movement of the mark 83 of the sleeve 38 through the window 84.

Conversely, in the case where the valve is transferred from the closed state to the opened state, when the piston is from the left end to the right, the ring 94 parts from the piston 31 and pressed to the ball 91 to press the ball and the sleeve 38 to the right by the urging force of the spring 95. In that case, however, the sleeve 38 is urged to the left by the urging force of the spring 88 through the ring 87 and the ball 84, hence the urging forces to the right and left are well balanced, and the sleeve 38 is stopped.

Thereafter, when the piston 31 is moved to the right and passes through inside the ball 84, the right end surface 31d is pressed to the ring 87 and move, while resisting to the urging force of the spring 88, the 87 to the right. By this movement, the ring 87 parts from the ball 84, hence the urging force which urges the ball 84 and the sleeve 38 to the left is released. In that case, the sleeve urged to the right by the urging force of the spring 95 through the ring 84 and the ball 91 is moved to the right. As the result, as mentioned previously, the ball 96 lifted up and the ball 97 is pressed down, and the limit switch 101 displaying the closing of the valve is turned ON, and the limit switch 102 displaying the opening of the valve is turned OFF. In that case, it is possible to recognize the opening of the valve by visually seeing the movement of the mark 83 of the sleeve 38 through the window 84.

In the embodiment of the invention, as mentioned above, it is designed that the sleeve is moved by using many balls, and the limit switches are changed over mutually. Thus, this display mechanism is very simple in structure and the display of the opening and closing of the valve can be performed securely.

Then, the sealing of the valve is illustrated below.

The valve used in the embodiment of the invention is a vacuum valve, hence the housing 11 for the main valve body 10 must be evacuated. On the one hand, to the second air chamber B of the valve operating mechanism 30 is applied a definite pressure P to drive the piston. On that account, it is necessary that this definite pressure P be sealed so that it does not act on the housing 11 of the main valve body 10.

In the embodiment of the invention, a bellows 103 is connected to between a concave portion 111 formed on the fourth block 37 and a concave portion 112 formed on the fifth block 43 fixed to the piston 31. Further, as mentioned previously, the O-ring 41 is lying between the small diameter portion 31b of the piston 31 and the first block 34.

When the bellows 103 and the O-ring 41 are not provided in this embodiment, the definite pressure P of the second air chamber B will act on between the fifth block 43 and the fourth block 37 through between the small diameter portion 31b of the piston 31 and the first and second blocks 34 and 35, and then acts on the housing 11 of the main valve body 10 through a space between a groove 54 of the fourth block 37 and a groove 53 of the base portion 51 of the screw 50 and further through the stepped hole 73 of the screw 50.

In the embodiment of the invention, however, as mentioned above, because of the bellows 103 and O-ring 41 as provided, the definite pressure P is reduced in action as a first stage by the O-ring 41, and by the bellows 103 as a second sage, and thus the action on the housing 11 of the main valve body 10 of the definite pressure P is completely hindered by the above-mentioned two sealing actions. Thus, the inner part of the housing 11 can be evacuated very favorably.

In the prior art valve operating mechanisms, there was involved such a problem that a service life of the bellows is short, because the valve body is drove, hence a torque will act on the bellows which is then deteriorated in some cases.

In contrast thereto, according to the embodiment of the invention, the force of the piston in the axial direction is converted into a torque by a cooperative action of the screw 50 and the pivot 75, and the screw 50 is supported moveably in the axial direction by the fourth block 37 by means of balls 55 constituting a slide bearing. On that account, the torque of the pivot 75 is not applied at all to the bellows 103. Thus, the deterioration of the bellows 103 can be inhibited to a great extent, and a long service life of the bellows 103 can be expected.

In the valve operating mechanism according to the embodiment of the invention, the large diameter portion 31a of the piston 31 is sealed from the sleeve by means of an O-ring 39 provided on the outer periphery of the piston 31, and a liaison between the first air chamber A and the second air chamber B is inhibited. Further, in the mechanism of the invention, two O-rings 104 are lying between the cylindrical member 32 and the sleeve 38, and an O-ring 105 is lying also between this cylindrical member 32 and the covering member 33. Furthermore, an O-ring 106 is lying between the large diameter portion of the piston 31 and the fifth block 43, and a metal seal 107 is lying between the third block 36 and the fourth block 37.

The present invention is limited in no way to the above-mentioned embodiment, and it will be understood that variations and modifications can be effected within the spirit and scope of the invention. For example, the valve operating mechanism illustrated in the embodiment of the invention mentioned above which has been applied to the gate valve, may also applicable to the operation of various kinds of valves, for instance, a butterfly valve.

As mentioned above, in the valve operating mechanism according to the present invention, a rectilinear motion may be converted into a rotary motion in good efficiency and smoothly and, moreover, the mechanism can be made compact.

What is claimed is:

1. A valve operating mechanism for producing a rotating force for causing a valve body of a valve to shift relative to a valve seat thereof, so that the valve is opened and closed, said mechanism comprising:

means, arranged in the housing of said mechanism, for producing a rectilinear reciprocating force;

a screw member supported moveably along the rectilinear line and unrotatably in the housing, receiving the rectilinear reciprocating force to perform a reciprocating motion along the rectilinear line, and including a pair of pawls helically projecting along the rectilinear line and a helical interval space defined between the helical pawls;

a pivot inserted into the helical interval space, and including both ends thereof; and a cylindrical rotating member supported rotatably and unmoveably along the rectilinear line in the housing so as to surround the screw member, and including a pair of holes formed in the peripheral surface of the cylindrical rotating member and supporting the both ends of the pivot, so that when the screw member receives the rectilinear reciprocating force to perform the reciprocating motion along the rectilinear line, the pivot is urged to rotate along the helical interval space in the rectilinearly unmoved state, and the cylindrical rotating member can rotate together with the pivot, whereby the cylindrical rotating member can output the rotating force for causing the valve body of the valve to shift relative to the valve seat thereof.

2. The valve operating mechanism of claim 1, wherein said reciprocating force producing means include:

a piston producing the reciprocating force so as to move the valve body;

a first cylinder chamber being designed that a fluid pressure acts on a large area and side surface of one side of the piston and the fluid pressure can be introduced thereinto and released therefrom; and a second cylinder chamber being designed that a definite fluid pressure is applied always to a small area side and surface formed on the other side of the piston and having a smaller area than the above-mentioned large area side and surface.

3. The valve operating mechanism of claim 1, further comprising:

a bellows, connected at one end to the housing and at the other end to the rectilinear producing means, for preventing the leakage of fluid on the side of the valve body through a space between the rectilinear force producing means.

4. The valve operating mechanism of claim 1, wherein said reciprocating force producing means include a piston having an annular pressure end surface to which a fluid pressure is applied, so that the valve body moves relative to the valve seat for opening and closing the valve; and wherein said valve operating mechanism further comprises:

a bellows connected at one end to the inside in the diametrical direction at the other end to a cylindrical fixing member of the housing of the valve operating mechanism, said bellows being flexible in the wake of the motion of the piston, and preventing the leakage of the fluid on the side of the valve body through a space between the piston and the cylindrical fixing member;

a small diameter sleeve extending in the axial direction so as to cover the bellows from the inside in the diametrical direction of an annular end surface of the piston;

a cylindrical wall formed on a housing so as to support slideably the small diameter sleeve; and a sealing member for sealing a space between the outer periphery of the small diameter sleeve and the inner periphery of the cylindrical wall.

5. A display mechanism for displaying the opening and closing of the valve interlocking with a valve operating mechanism for opening and closing the valve by shifting a valve body relative to a valve seat, said display mechanism comprising, a piston giving a driving force through various mechanical power transmitting parts so as to move the valve body, a housing holding the piston moveably in the axial direction and surrounding said piston so that pressure cylinder chambers are formed at both end sides of the piston, and an inner sleeve fitted between the inner periphery of said housing and the outer periphery of the piston and moving in the axial direction interlocking with the movement of the piston in the axial direction, wherein a concave groove is formed on the outer periphery of the inner sleeve, one of a pair of balls is held in this groove interlocking with the movement of this inner sleeve in the axial direction, and each ball is fitted with a limit switch which detects the opened or closed position of the valve by detecting either one of a pair of balls as to whether it is out of or held in the groove.

6. A display mechanism for displaying the opening and closing of the valve interlocking with a valve operating mechanism for opening and closing the valve by shifting a valve body relative to a valve seat, said display mechanism comprising, a piston giving a driving force through various mechanical power transmitting parts so as to move the valve body, a housing holding the piston moveably in the axial direction and surrounding said piston so that pressure cylinder chambers are formed at both end sides of the piston, and an inner sleeve fitted between the inner periphery of said housing and the outer periphery of the piston and moving in the axial direction interlocking with the movement of the piston in the axial direction, wherein a display mark is formed on the outer periphery of the inner sleeve, and this display mark can be looked at through a display window formed on the housing.

* * * * *

UNITED STATES PATENT AND TRADEMARK OFFICE
CERTIFICATE OF CORRECTION

PATENT NO. : 5,168,896

DATED : DECEMBER 8, 1992

INVENTOR(S) : HUBERT BOESCH and TSUTOMU TANIGUCHI

It is certified that error appears in the above-identified patent and that said Letters Patent is hereby corrected as shown below:

Title Page:
Abstract Line 18 after "rotate" insert --together--.

Column 2 Lines 49-50 "rectilienarly" should read --rectilinearly--.

Column 4 Line 28 "plate 15" should read --plate 16--.

Column 5 Line 30 "plate 15" should read --plate 16--.

Column 6 Line 59 "and" should read --end--.

Column 6 Line 59 "left" (2nd occurrence) should read --right--.

Column 8 Line 64 "o" should read --on--.

Column 9 Line 13 "4" should read --84--.

Column 10 Line 24 before "87" insert --ring--.

Column 11 Line 7 "sage" should read --stage--.

UNITED STATES PATENT AND TRADEMARK OFFICE
CERTIFICATE OF CORRECTION

PATENT NO. : 5,168,896
DATED : December 8, 1992
INVENTOR(S) : Hubert Boesch, et al.

It is certified that error appears in the above-indentified patent and that said Letters Patent is hereby corrected as shown below:

Claim 4, line 48, column 12, after "direction" insert--of the annular pressure end surface of the piston and connected--.

Signed and Sealed this

First Day of February, 1994

Attest:

BRUCE LEHMAN

Attesting Officer  Commissioner of Patents and Trademarks